Oct. 2, 1945.    L. KLINGEN    2,386,122
INJECTOR FOR CONDUITS
Filed Sept. 4, 1944
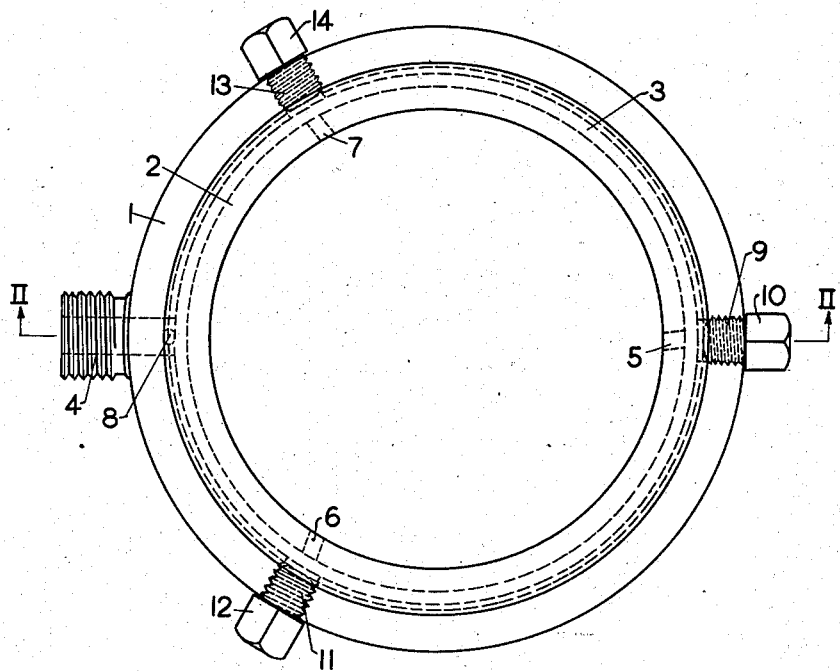
Fig. I
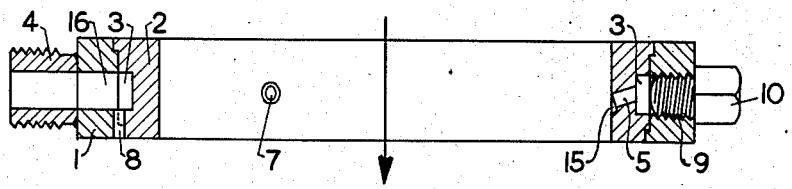
Fig. II
Inventor: Leendert Klingen
By his Attorney:

Patented Oct. 2, 1945

2,386,122

UNITED STATES PATENT OFFICE 2,386,122

INJECTOR FOR CONDUITS

Leendert Klingen, Martinez, Calif., assignor to Shell Development Company, San Francisco, Calif., a corporation of Delaware Application September 4, 1944, Serial No. 552,709

10 Claims. (Cl. 299—114)

The present invention relates to an improved injector for adding fluids to fluid carrying conduits. More particularly, the present invention relates to an injector which serves to thoroughly mix injected fluids with fluids flowing through a conduit.

In various industrial processes, in the operation of pipeline systems and in numerous other instances, it is often desired to inject and mix a fluid with a second fluid which is flowing through a conduit. The thorough mixing of two fluids in such circumstances, particularly when the fluids are immiscible and the quantity to be injected is relatively small, it is very difficult and heretofore has been attained only by the use of complicated and expensive mixing equipment or by the use of baffled conduit injectors which have the disadvantage of causing considerable back pressure in the conduit system.

It is an object of the present invention to provide an improved conduit injector which provides thorough and complete mixing of the fluid injected with the fluid passing through the conduit, regardless of the nature of the fluids or the relative quantities involved. It is a further object of the invention to provide an improved injector which will not cause back pressure in the conduit to which the injected fluid is being supplied. Still another object is to provide an injector of the type described above which is inexpensive and simple to construct and maintain. Other objects, together with some of the advantages to be derived in utilizing the present invention, will become apparent from the following detailed description thereof, taken together with the accompanying drawing forming a part of the specification and wherein:

Figure I is an end elevation of an injector according to the present invention and Figure II is a sectional elevation through II—II of Figure I.

Referring to the drawing, the injector comprises a pair of concentric rings 1 and 2, the outer face of inner ring 2 being provided with an annular channel 3 and forming an annular manifold when rings 1 and 2 are placed together as shown in the drawing. A port 16 is provided in outer ring 1 and is in flow communication with threaded nipple 4, which is rigidly attached to ring 1, and with annular manifold 3.

A plurality of injection ports 5, 6 and 7 are provided in inner ring 2 and are evenly spaced therearound. Injection ports 5, 6 and 7 are each in flow communication with annular manifold 3 and with the conduit defined by the inner surface of inner ring 2. Ports 9, 11 and 13 are provided in outer ring 1 and are in flow communication with annular manifold 3 and injection ports 5, 6 and 7. Ports 9, 11 and 13 are provided with plugs 10, 12 and 14 respectively, plugs 10, 12 and 14 threadedly engaging outer ring 1. Pin 8, which engages both outer ring 1 and inner ring 2, serves to aline outer ring 1 with respect to inner ring 2 in such position that ports 9, 11 and 13 are in direct flow communication with injection ports 5, 6 and 7 respectively when assembling the injector. Outer ring 1 fits over inner ring 2 in a close pressed fit.

Referring particularly to Figure I, injection ports 5, 6 and 7 are each disposed radially askew in the same direction 5° with respect to the longitudinal axis of the conduit. Although 5° skew has been found generally preferable for optimum mixing, the desired effect to a degree is attained when the injection ports are radially askew from approximately 1° to 10°.

Referring particularly to Figure II, injection ports 5, 6 and 7 are also inclined, in the direction of flow through the injector, 15° with respect to a plane perpendicular to the longitudinal axis of the conduit defined by inner ring 2. Although an approximately 15° inclination in the direction of flow is preferable for general utilization, offsets varying from approximately 10° to approximately 25° are operable for use according to the present invention.

The discharge outlet of each of injection ports 5, 6 and 7 is countersunk at an angle to the interior face of inner ring 2 as shown at 15 of Figure II, it having been found that feathering of the fluid streams injected is virtually obviated by this expedient. The base of the countersink is flush with the discharge end of the injection port on the upstream side thereof and subtends the same angle with the inside wall of inner ring 2 on the downstream side as the downstream offset of the injection conduit. Thus, in Figure II, the base of countersink 15 subtends an angle of 15° with the inner face of inner ring 2 and injection conduit 5 is offset 15° in the direction of flow with respect to a plane perpendicular to the longitudinal axis of the conduit defined by inner ring 2. If an injector is employed having injection ports with a downstream offset of 20°, countersink 15 should be modified so that the upstream side of the base thereof is flush with the discharge outlet of the injection port and the downstream side thereof subtends an angle of 20° with the inner face of inner ring 2.

In operation, the injector is disposed in a conduit between flanges normally connecting two lengths of conduits or in any other suitable manner, inner ring 2 of the injector preferably having the same inside diameter as the conduit. The fluid which is to be injected is supplied to nipple 4 by means of a pressure pump or other means suitable for providing a supply of the material to be injected at a pressure exceeding that of the fluid within the conduit. The pressure differential should be at least approximately 25 p. s. i. and preferably about 40-50 p. s.i. or more. The streams of fluid injected form a vortex near the center of the conduit which rapidly disintegrates into a fine dispersion and provides maximum mixing and/or blending of the injected fluid with that flowing through the conduit.

Injection ports 5, 6 and 7 may be inspected or cleansed when necessary or desirable by removing plugs 10, 12 and 14, thus gaining access to the injection ports through ports 9, 11 and 13.

The following operating examples illustrate the practical utilization of the invention.

*Example I*

Liquid hydrocarbon material containing traces of caustic from a previous treating operation was passed through a conduit 6 inches in diameter at a rate of 7000 barrels per day. In order to remove the caustic, water was injected into the conduit at a rate of approximately 30 gallons per minute by means of an injector of the type described above. The inner ring 2 of the injector had an inside diameter of 6 inches, injection ports 5, 6 and 7 were each ¼ inch in diameter and were each radially askew 5° and provided with a downstream offset of 15°. A 55 p. s. i. pressure differential was employed. Substantially complete extraction of the caustic from the hydrocarbon material resulted when the aqueous and hydrocarbon phases were separated in a settling chamber at the end of the conduit.

*Example II*

Liquid hydrocarbon material containing acidic components was passed through a conduit 3 inches in diameter at a rate of 900 barrels per day. In order to neutralize the hydrocarbon material, 16° Bé. aqueous sodium hydroxide solution was injected into the conduit at a rate of 20 gallons per minute and at an approximately 50 p. s. i. pressure differential. Inner ring 2 of the injector had an inside diameter of 3 inches and the injection ports were each $\frac{3}{16}$ inch in diameter, radially askew 5° and provided with a downstream offset of 15°. Complete neutralization of the hydrocarbon material was attained.

Various applications for which the present injectors are suitable include, among others, the treatment of one fluid with another as in the examples above, the blending of two or more miscible fluids in a conduit, the addition of corrosion inhibitors or scale removing compounds to pipelines or other conduit systems, the treatment of malt liquors with bisulphite or other solutions as is commonly practiced in the brewing industry, etc. The present injector is, in fact, adapted for use in dispersing any fluid, whether in the form of homogeneous liquid, gas slurry, emulsion or dispersion in a second fluid passing through a conduit, regardless of the compatibility of the two fluids.

I claim as my invention:

1. In equipment of the class described, the combination comprising conduit means and a plurality of injection ports in flow communication with said conduit means and lying in a plane which makes an angle of substantially 15° with a plane perpendicular to the longitudinal axis of said conduit means so that the said ports are inclined in the direction of normal flow through said conduit means, each of said injection ports being also radially askew in the same direction with respect to the longitudinal axis of said conduit means.

2. In equipment of the class described, the combination comprising conduit means and a plurality of injection ports in flow communication with said conduit means and lying in a plane which makes an angle of substantially 10° to 25° with a plane perpendicular to the longitudinal axis of said conduit means so that each of said injection ports is inclined from approximately 10° to approximately 25° in the direction of normal flow through said conduit means, each of said injection ports being also radially askew in the same direction from approximately 1° to approximately 10° with respect to the longitudinal axis of said conduit means.

3. In equipment of the class described, the combination comprising a manifold housing including an annular manifold therein, said manifold housing defining a conduit element, and a plurality of injection ports in flow communication with said manifold and said conduit element, each of said injection ports being radially askew in the same direction with respect to the longitudinal axis of said conduit element, each of said injection ports being inclined in the direction of normal flow through said conduit element and with respect to a plane perpendicular to the longitudinal axis of said conduit element.

4. In equipment of the class described, the combination comprising a manifold housing including an annular manifold therein, said manifold housing defining a conduit element, and a plurality of injection ports in flow communication with said manifold and said conduit element, each of said injection ports being radially askew in the same direction with respect to the longitudinal axis of said conduit element, each of said injection ports being inclined in the direction of normal flow through said conduit element and with respect to a plane perpendicular to the longitudinal axis of said conduit element, each of said injection ports being countersunk at the discharge outlet thereof, each countersink being flush with the discharge end of the injection port on the upstream side thereof and subtending an angle with the wall of said conduit element on the downstream side thereof.

5. In equipment of the class described, the combination comprising a manifold housing including an annular manifold therein, said manifold housing defining a conduit element, and a plurality of injection ports in flow communication with said manifold and said conduit element, each of said injection ports being radially askew in the same direction with respect to the longitudinal axis of said conduit element, each of said injection ports being inclined in the direction of normal flow through said conduit element and with respect to a plane perpendicular to the longitudinal axis of said conduit element, each of said injection ports being countersunk at the discharge outlet thereof, each countersink being flush with the discharge end of the injection ports on the upstream side thereof and subtending an angle with the wall of said conduit element on the downstream side thereof equal to the angle of downstream inclination of said injection ports.

6. In equipment of the class described, the combination comprising a manifold housing including an annular manifold therein, said manifold housing defining a conduit element, and a plurality of injection ports regularly spaced around said manifold housing and in flow communication with said manifold and said conduit element, each of said injection ports being radially askew in the same direction between approximately 1° and 10° with respect to the longitudinal axis of said conduit element, each of said injection ports being inclined in the direction of normal flow through said conduit element and with respect to a plane perpendicular to the longitudinal axis of said conduit element.

7. In equipment of the class described, the combination comprising a manifold housing including an annular manifold therein, said manifold housing defining a conduit element, and a plurality of injection ports regularly spaced around said manifold housing and in flow communication with said manifold and said conduit element, each of said injection ports being radially askew in the same direction with respect to the longitudinal axis of said conduit element, each of said injection ports being inclined from approximately 10° to approximately 25° in the direction of normal flow through said conduit element and with respect to a plane perpendicular to the longitudinal axis of said conduit element.

8. In equipment of the class described, the combination comprising a manifold housing including an annular manifold therein, said manifold housing defining a conduit element, and a plurality of injection ports regularly spaced around said manifold housing and in flow communication with said manifold and said conduit element, each of said injection ports being radially askew in the same direction between approximately 1° and approximately 10° with respect to the longitudinal axis of said conduit element, each of said injection ports being inclined from approximately 10° to approximately 25° in the direction of normal flow through said conduit element and with respect to a plane perpendicular to the longitudinal axis of said conduit element.

9. In equipment of the class described, the combination comprising a manifold housing including an annular manifold therein, said manifold housing defining a conduit element, and a plurality of injection ports regularly spaced around said manifold housing and in flow communication with said manifold and said conduit element, each of said injection ports being radially askew in the same direction approximately 5° with respect to the longitudinal axis of said conduit element, each of said injection ports being inclined approximately 15° in the direction of normal flow through said conduit element and with respect to a plane perpendicular to the longitudinal axis of said conduit element.

10. In equipment of the class described, the combination comprising a manifold housing including an annular manifold therein, said manifold housing defining a conduit element, and a plurality of injection ports regularly spaced around said manifold housing and in flow communication with said manifold and said conduit element, each of said injection ports being radially askew in the same direction between approximately 1° and approximately 10° with respect to the longitudinal axis of said conduit element, each of said injection ports being inclined from approximately 10° to approximately 25° in the direction of normal flow through said conduit element and with respect to a plane perpendicular to the longitudinal axis of said conduit element, each of said injection ports being countersunk at the discharge outlet thereof, each countersink being flush with the discharge end of the injection port on the upstream side thereof and subtending an angle with the wall of said conduit element on the downstream side thereof, said angle being equal to the downstream offset angle of said injection ports.

LEENDERT KLINGEN.